United States Patent
Cao et al.

(10) Patent No.: US 10,148,700 B2
(45) Date of Patent: Dec. 4, 2018

(54) CLASSIFICATION OF TOP-LEVEL DOMAIN (TLD) WEBSITES BASED ON A KNOWN WEBSITE CLASSIFICATION

(71) Applicant: Fortinet, Inc., Sunnyvale, CA (US)

(72) Inventors: Xiping Cao, Coquitlam (CA); Kai Xu, Burnaby (CA); Ye Ma, Burnaby (CA); Raymond Quoc Minh Chan, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 160 days.

(21) Appl. No.: 15/199,492

(22) Filed: Jun. 30, 2016

(65) Prior Publication Data
US 2018/0007090 A1    Jan. 4, 2018

(51) Int. Cl.
*H04L 29/06* (2006.01)
*H04L 29/12* (2006.01)

(52) U.S. Cl.
CPC ........ *H04L 63/205* (2013.01); *H04L 61/1511* (2013.01); *H04L 63/101* (2013.01); *H04L 63/126* (2013.01)

(58) Field of Classification Search
None
See application file for complete search history.

(56) References Cited

U.S. PATENT DOCUMENTS

| | | | |
|---|---|---|---|
| 2002/0133514 A1* | 9/2002 | Bates | G06F 17/272 715/201 |
| 2006/0068755 A1* | 3/2006 | Shraim | H04L 51/12 455/410 |
| 2016/0224636 A1* | 8/2016 | Kutzkov | G06F 17/30539 |
| 2016/0352772 A1* | 12/2016 | O'Connor | H04L 63/145 |

* cited by examiner

*Primary Examiner* — David Le
(74) *Attorney, Agent, or Firm* — Hamilton, DeSanctis & Cha LLP

(57) ABSTRACT

Systems and methods for classification of web sites and/or their corresponding URLs based on a known web site classification are provided. According to one embodiment, a website URL is received that is known to be associated with a particular content classification. A list of candidate domain names including a host name of the website URL is generated based on a defined TLD list. For each of the candidate domain names it is determined whether an IP address of the candidate domain name is equal to an IP address of the website URL. When the result is affirmative, the particular content classification is associated with the candidate domain name; otherwise, a cosine similarity measurement process is performed between information associated with the candidate domain name and information associated with the website URL to determine whether to associate the particular content classification with the candidate domain name.

12 Claims, 10 Drawing Sheets

CLASSIFICATION OF TOP-LEVEL DOMAIN (TLD) WEBSITES BASED ON A KNOWN WEBSITE CLASSIFICATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to web site classification. In particular, embodiments of the present invention relate to classification of web sites and/or their corresponding Uniform Resource Locators (URLs) based on a known host name/web site classification.

Description of the Related Art

Web domains may belong to different categories such as sports, news, entertainment, business, pornography, hate speech and the like, depending on the content/services being offered. As there are millions of web domains that include different types of content, some of such domains may include desired content, while some other may include content that is undesirable for different types of users. Such undesired web domains therefore are typically classified, and a list of restricted web domains, which may be included in a blacklist, for example, is compiled so as to help network security devices/applications filter such traffic and/or inform a network administrator/user about the type of content that the requested web page and/or web domain contains.

Existing security devices/applications generally include a list of websites that need to be blocked depending on the network setting and/or the profile of the user who attempts to access the websites. For example, if a child attempts to access a pornographic website, the security device/application may block access to the adult content website to prevent access by the child. Similarly, if someone tries to access similar objectionable content from office premises, such access can be blocked/denied by the security device/application. It is also possible that, for the same web domain, access is allowed for one user (for example, an adult), but not allowed for another user (for example, a child).

Existing security devices/applications also typically maintain a reference table that includes a list of websites that are classified in different categories, and refer to one or more policy rules to decide whether access to a particular website should be allowed to a particular user. Compilation of such a list is a tedious and time consuming task, wherein the network administrator either has to manually provide a list of restricted websites or the security device/application needs to expend valuable computing resources to classify observed websites into different categories to determine whether access to a particular website should be given.

Web page classification, also commonly referred to as web page categorization or web domain classification, is a process of classifying web pages and/or a web domains and/or URLs into different meaningful categories. Prior art solutions provide different classification approaches for classifying a web domain or a web page in different categories based on the content of the web page. However, these solutions require time, and with numerous web domains being added every day, these domains need to be classified promptly for web page classification to be of value. Owners of restricted web domains typically exploit such loopholes and create new web domains to provide the same service/content as being provided over the known restricted web domains. For instance, if foo.com is known to be a pornographic website, the owner of foo.com can quickly create foo.net, and offer the same restricted content. Therefore, a web site owner generally creates different domain names to attract users, and also to bypass restrictions imposed by existing security devices/applications. Existing systems take quite a bit of time to classify such new web domains as they need to implement content-based classification on the new web domains, which requires significant computational resources.

Therefore, there exists a need for systems and methods for efficient and quick domain name classification so as to meet different performance parameters and keep the list of allowed and/or blacklisted web domains updated.

SUMMARY

Systems and methods are described for classification of web sites and/or their corresponding URLs based on a known web site classification. According to one embodiment, a website Uniform Resource Locator (URL) is received that is known to be associated with a particular content classification. A list of candidate domain names including a host name of the website URL is generated based on a defined top level domain (TLD) list. For each of the candidate domain names it is determined whether an Internet Protocol (IP) address of the candidate domain name is equal to an IP address of the website URL. When the result is affirmative, the particular content classification is associated with the candidate domain name; otherwise, a cosine similarity measurement process is performed between information associated with the candidate domain name and information associated with the website URL to determine whether to associate the particular content classification with the candidate domain name.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
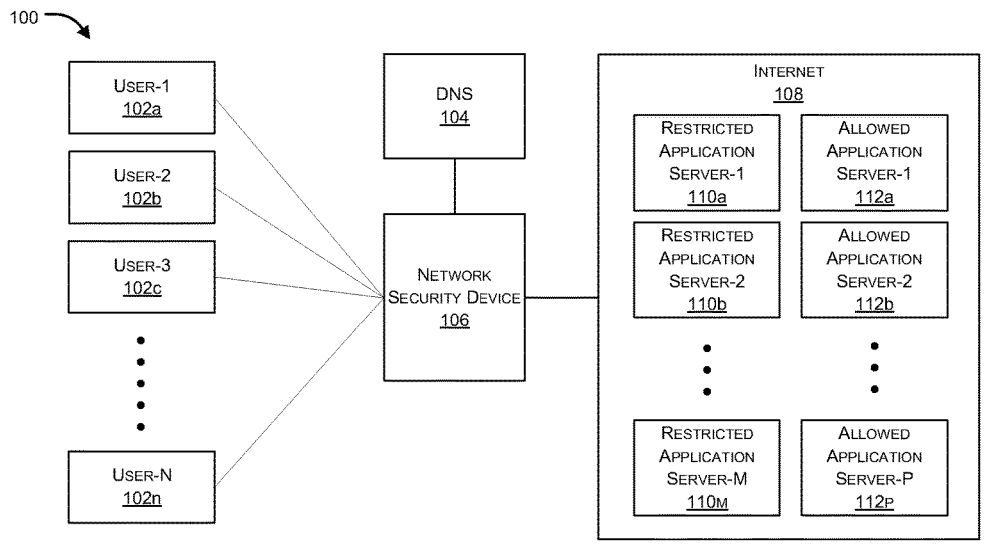
FIGS. 1A to 1C illustrate exemplary network security architectures in which or with which embodiments of the present invention can be implemented.

Systems and methods are described for classification of web sites and/or their corresponding URLs based on a known web site classification. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of conducting website/URL classification, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Systems, methods, and non-transitory computer-readable storage mediums are described for classification of web sites and/or their corresponding URLs based on a known web site classification.

In an aspect, a website Uniform Resource Locator (URL) associated with a particular content classification (which may be interchangeably referred to herein as class) can be received, a list of candidate domain names including a host name of the website URL based on a defined top level domain (TLD) list can be generated, and a determination can be made for each of the candidate domain names in the list of candidate domain names as to whether the candidate domain should be classified in the particular content class associated with the given URL. In an exemplary implementation, for making the determination, an IP address of the candidate domain name can be compared with an IP address of the website URL such that when the result of comparison is affirmative (i.e., the IP address of the website URL matches with the IP address of the candidate domain name), the particular content class/classification can be associated with the candidate domain name. On the other hand, when the result of the comparison is negative, a cosine similarity measurement can be performed to determine cosine similarity between information associated with the candidate domain name and information associated with the website URL to determine whether to associate the particular content class with the candidate domain name.

In an aspect, a cosine similarity measurement process can include steps of retrieving anchor information pertaining to the candidate domain name, generating a first vector for the candidate domain name based on the retrieved anchor information, computing a cosine similarity metric between the first vector and a corresponding vector of the website URL, determining whether the computed cosine similarity metric is greater than a defined threshold, and when the computed cosine similarity metric is determined to be greater than the defined threshold, associating the particular content classification with the candidate domain name.

In exemplary implementations, the anchor information can include, but is not limited to, tag(s) of a web page to which the candidate domain name pertains, a title of the web page, metadata of the web page, hyperlinks of the web page, content of the web page, display attributes of the web page, a structure of the web page, and a layout of the web page. In an aspect, each candidate domain name in the list of candidate domain names can include a fully qualified domain name (FQDN). In an exemplary implementation, the particular content classification can be indicative of pornographic content, hate speeches, news, sports, arts, business and other predefined classes.

In an exemplary implementation, a first hash value can be generated by hashing the first vector, and the first hash can then be compared with hash of the vector of the website URL for computing the cosine similarity metric.

In an aspect, a non-transitory computer-readable storage medium embodying a set of instructions is also described. The set of instructions when executed by one or more processors of one or more computer systems can be configured to cause the one or more processors to perform a method that include steps of receiving a website Uniform Resource Locator (URL) that is known to be associated with a particular content classification/class, generating a list of candidate domain names including a host name of the website URL based on a defined top level domain (TLD) list, determining for each of the candidate domain names in the list of candidate domain names whether an IP address of the candidate domain name is equal to an IP address of the website URL, associating the particular content classification with the candidate domain name when a result of said determining is affirmative and performing, when the result is negative, a cosine similarity measurement process between information associated with the candidate domain name and information associated with the website URL to determine whether to associate the particular content classification/class with the candidate domain name.

Figure 1B:
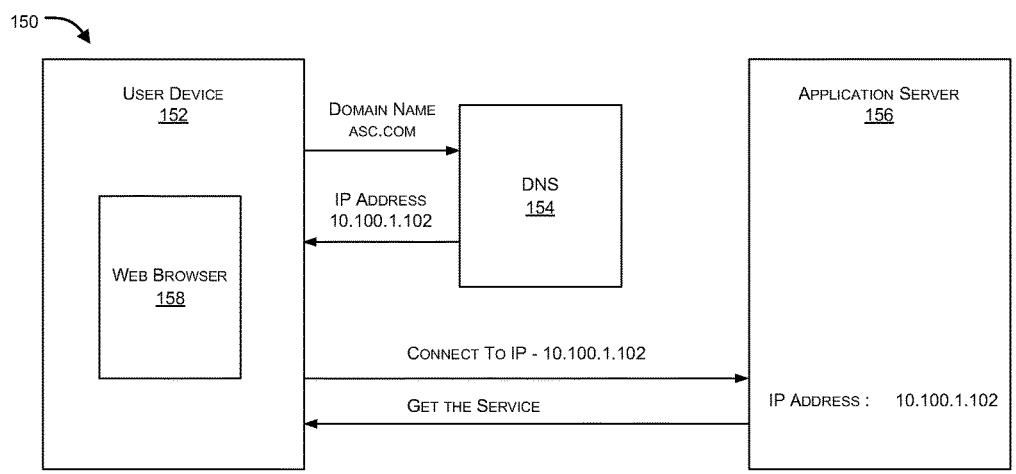
Figure 1C:
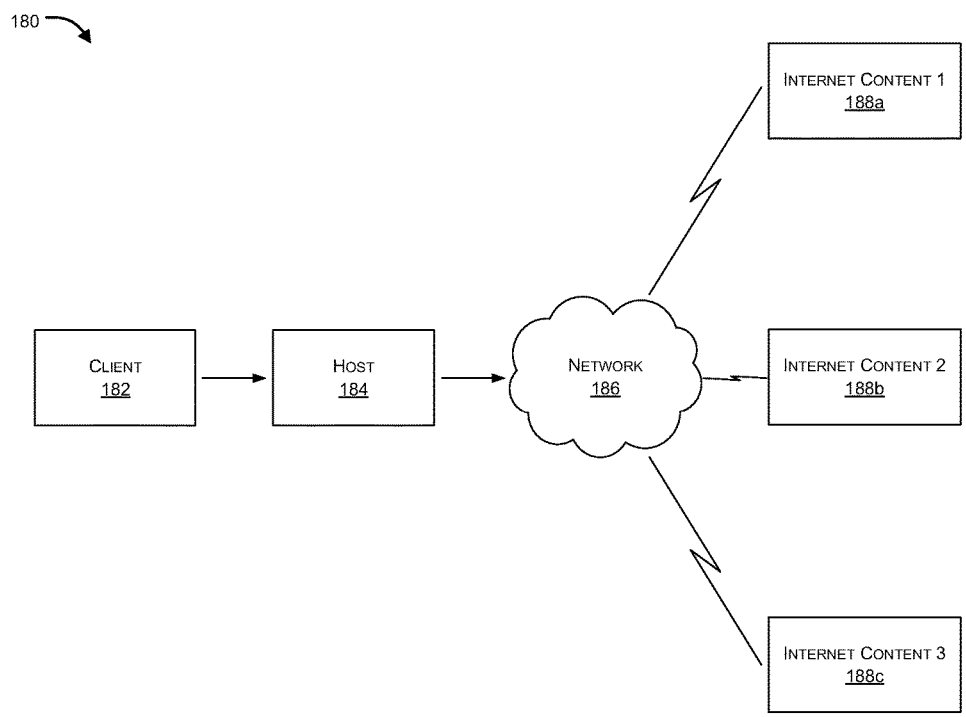

FIGS. 1A to 1C illustrate exemplary network security architectures 100 and 150 in which or with which embodiments of the present invention can be implemented. As shown in FIG. 1A, a network security device 106 can be configured to perform domain name classification. In exemplary implementations, network security device 106 can be any or a combination of a gateway, a router, an Intrusion Prevention System (IPS), an Intrusion Detection System (IDS), a network controller, a firewall, or any other network device configured to protect a private network (e.g., an enterprise network, a datacenter or the like). Network security device 106 can be coupled with a Domain Name Server (DNS) 104, which can respond to DNS requests (e.g., by providing an IP address associated with a domain name when requested).

In an exemplary implementation, when a user (e.g., user 102a-n) of a protected network attempts to connect to a restricted domain, site, or application server (e.g., restricted application server 110a-m) or otherwise tries to access services provided by the restricted domain through Internet 108, network security device 106 can receive/retrieve a webpage link (which may also be referred to interchangeably as a web-link, a URL or a website URL) associated with the restricted domain, check if a host name of the website URL matches partially or fully with any of a predetermined list of host names, generate a list of candidate domain names including a host name of the website URL based on a defined top level domain (TLD), determine an IP address associated with the website URL, and for each candidate domain name, determine whether the determined IP address of the website URL matches with the IP address of any candidate domain. In an exemplary implementation, when the IP address of a candidate domain name matches the IP address of the website URL at issue, network security device 106 can associate a particular content classification/class (that is associated with the website URL) with the candidate domain name (as the candidate domain name is simply an alias for or represents a different link (i.e., a re-directing page) to the same content as the website URL).

In an exemplary implementation, DNS 104 can maintain a mapping of domain names and IP addresses. For example, DNS 104 may store or otherwise have access to IP addresses for all restricted application servers 110a-m as well as allowed application servers 112a-p.

In an aspect, network security device 106 may have/maintain a list of domain names and their associated content classification/class, either in a local database or in any other coupled repository. In an exemplary implementation, network security device 106 can maintain a list of URLs of restricted application servers, for example of restricted application server-1 110a or restricted application server-2 110b, wherein the network security device 106 can associate a classification/class for each webpage URL of restricted application servers 110a-n. A list of restricted URLs (which may also be referred to interchangeably as a list of URLs) can be maintained at network security device 106, wherein such a list of restricted URLs can be updated by an authorized user or automatically in accordance with an embodiment of the present disclosure. In an exemplary implementation, once a URL with an associated class is received, network service device 106 can generate a list of candidate domain names including a host name of the URL based on a defined top level domain (TLD) list, wherein the defined TLD list can include known TLDs. For example, once the network security device 106 receives a website URL (e.g., xyz.com) that is associated with a particular classification/class (e.g., pornographic), a list of candidate domain names, for example xyz.co.uk, xyz.in, xyz.net, xyz.io, xyz.org, xyz.co.in, xyz.edu, xyz.tv, etc. can be generated. Further, network security device 106 can determine, for each candidate domain name in the list of candidate domain names, whether its IP address is the same as the IP address of the website URL. When the result of such a determination is affirmative, the particular content classification (e.g., pornographic) can be associated with the candidate domain name. For example, if the IP address of candidate domain name xyz.co.uk is same as that of the website URL xyz.com, the candidate domain name xyz.co.uk can also be classified as "pornographic." On the other hand, when the result is negative, i.e., the IP address of the candidate domain name is not equal to the IP address of the website URL, network security device 106 can perform a similarity measurement between information associated with the candidate domain name and information associated with the website URL in order to determine whether or not to associate the particular content classification with the candidate domain name. In one embodiment the similarity measurement is by way of cosine similarity as discussed further below.

It is to be appreciated that although the present disclosure has been illustrated for classification/categorization of illegitimate/undesired webpage/website/URL to enable content filtering, aspects of the present disclosure can be equally implemented for legitimate websites as well. For instance, in case domain name abc.com is pre-classified as class "News", and candidate domain names abc.net and abc.org also have the same IP address as that of abc.com, such candidate domain names can also be automatically classified with the class "News". Any number of classes/sub-classes can therefore be defined and used for categorizing websites, all of which possible embodiments are completely within the scope of the present invention.

It is further possible that a given website is categorized into multiple classes based on webpages that form part of the website. For instance, yahoo.com can be categorized into content classification of "news" as well as "email service" as well as "e-commerce", and therefore if another candidate domain name yahoo.net also has the same IP address as that of yahoo.com, all the classifications associated with yahoo.com and can be associated with yahoo.net as well.

FIG. 1B illustrates exemplary sequence of operations taking place between a user device 152, DNS 154, and an application server 156 to enable web browsing. As shown in FIG. 1B, when a user, using the user device 152, enters a domain name (which may also be referred to herein interchangeably as a webpage URL or URL), for example asc.com, in web browser 158 of the user device 152, the device 152 requests the IP address of the URL from DNS 154 before connecting to application server 156. DNS 154, upon receiving a domain name, can check whether a relevant record in the form of a valid IP address for the domain name exists or not, wherein if an IP address exists for the received domain name, DNS 154 can provide the IP address, for example 10.100.1.102, to user device 152, based on which user device 152 can then connect with application server 156 using the IP address.

FIG. 1C illustrates general user browsing behavior where a client device 182 connects with a host 184 for any desired service by means of a URL, wherein the URL can direct to an associated webpage that may include other hyperlinks that a user of the client device 182 can select/click in order to access other content, for example Internet Content 1 188a, Internet Content 2 188b, and Internet Content 3 188c, over the network 186. When any external web-link or hyperlink is selected on a webpage, for example, a network security device can quickly determine the classification/class to which the selected URL belongs and allow access, block or warn the end user about the requested website URL accordingly.

Figure 2:
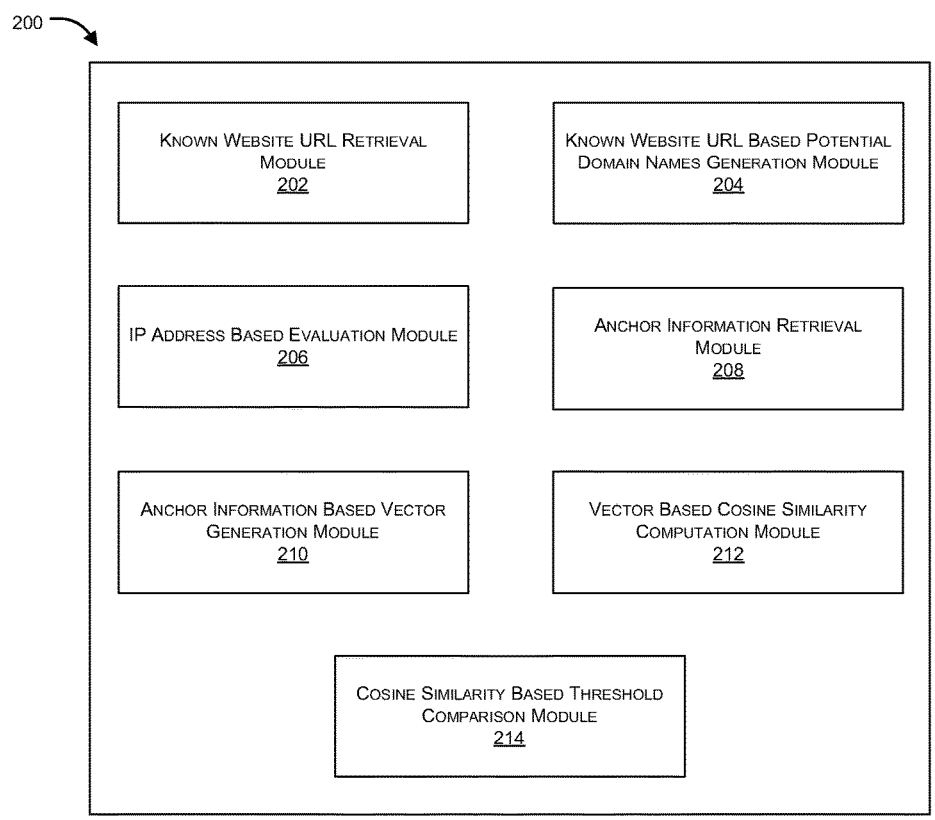
FIG. 2 illustrates an exemplary functional module diagram of a domain name classification system in accordance with an embodiment of the present invention.

FIG. 2 illustrates an exemplary functional module diagram of a domain name classification system 200 in accordance with an embodiment of the present invention. As shown in FIG. 2, domain name classification system 200 can include a known website URL retrieval module 202 configured to receive a website URL that is known to be associated with a particular content classification/class, a known website URL based potential domain name generation module 204 configured to generate list of candidate domain names including a host name of the website URL based on a predefined TLD list, and an IP address based evaluation module 206 configured to evaluate each candidate domain name in the list of candidate domain names by comparing IP address of the candidate domain name with IP address of the website URL to associate the particular content class with the candidate domain name if a match between the IP addresses is found. Otherwise, when the IP addresses do not match, system 200 can perform a cosine similarity processes to determine whether the candidate domain name should be associated with the particular content class. In one embodiment, module 206 can determine, for each candidate domain name, as to whether IP address of the candidate domain name is same as that of the website URL, and associate the particular content classification/class with the candidate domain name when the result of such determination is affirmative.

In an aspect, system 200 can be configured to perform a similarity measurement between information associated with the candidate domain name and information associated with the website URL so as to determine whether to associate the particular content classification of the website URL with the candidate domain name. In one embodiment the similarity measurement is by way of cosine similarity, which measures the similarity between two vectors of an inner product space that measures the cosine of the angle between them. The cosine of 0° is 1, and it is less than 1 for any other angle. Cosine similarity is thus a judgment of orientation and not magnitude: two vectors with the same orientation have a cosine similarity of 1, two vectors at 90° have a similarity of 0, and two vectors diametrically opposed have a similarity of −1, independent of their magnitude. Those skilled in the art will appreciate various other similarity measurements (non-limiting examples of which include inner product, Pearson correlation and OLS coefficients) may be used in alternative embodiments.

System 200 further includes an anchor information retrieval module 208 configured retrieve anchor information pertaining to the candidate domain name, an anchor information based vector generation module 210 to generate a first vector for the candidate domain name based on the retrieved anchor information, a vector based cosine similarity computation module 212 to compute a cosine similarity metric between the first vector and a corresponding vector of the website URL, and a cosine similarity based threshold comparison module 214 to determine whether the computed cosine similarity metric is greater than a defined threshold such that when the computed cosine similarity metric is determined to be greater than the defined threshold, the particular content classification of the website URL is associated with the candidate domain name.

In an exemplary implementation, the anchor information can include, but is not limited to, tag(s) of web page to which the candidate domain name pertains, a title of the web page, metadata of the web page, hyperlinks of the web page, content of the web page, display attributes of the web page, a structure of the web page, and a layout of the web page.

In an exemplary implementation, for vector based cosine similarity computation, system 200 can generate a first hash for the first vector, and compare the first hash with a hash of the vector of the website URL. In an exemplary aspect, the candidate domain name can include a fully qualified domain name (FQDN). In another exemplary embodiment, the particular content classification can be any or a combination of pornographic content, hate speech, news, sports, arts, business, social media, e-commerce, among any other classification/class or sub-class thereof, all of which possible classes/sub-classes are well within the scope of the present disclosure.

In an aspect, system 200 provides a fast way of classifying web URLs, wherein the system 200 has no dependency on any external component and can provide a wide coverage in terms of classification of web URLs. System 200 can be explained with an example, where a website URL foo.com has been identified as being associated with pornographic content, in which case, system 200 can generate a list of candidate domain names (e.g., foo.net, foo.biz, foo.info, foo.org, foo.info, etc.) based on the host name "foo" and a list of TLDs, for example, .net, .biz, .info, .org, .info and the like. An official list of Internet top-level domain extensions that contains all top-level domains, which are those domains in the DNS root zone of the DNS of the Internet is maintained by the Internet Assigned Numbers Authority (IANA) and can currently be found at http://www.iana.org/domains/root/db. In one embodiment, the list of TLDs used by system 200 is a subset or the entirety of IANA's official list as updated from time to time. Depending upon the particular implementation, other TLD lists may be used as is or as modified by a network administrator.

After the list of candidate domain names has been generated, system 200 can then determine whether the IP address of a candidate domain name is the same as the IP address of the website URL (e.g., foo.com) having a known classification (e.g., pornographic), in which case, the candidate domain name is classified as also being related to pornographic content. For those of the candidate domain names whose IP addresses do not match with that of the website URL foo.com, system 200 can retrieve an HTML anchor (or any other information/attribute of the candidate domain name as mentioned above) and compute a hash value for the website URL foo.com as well as for these other candidate domain names, and perform a cosine similarity measurement between the hash values. In an exemplary implementation, a vector of a given domain name can be created from anchor information. A non-limiting example of a web page document vector is provided below:

Webpage-1 document vector{Title, Description, Keywords, SubLink, Text};

Each element of the vector can be associated with a weighted value i. A vector can be determined for each candidate domain name and for the pre-classified webpage URL (e.g. foo.com). In an exemplary implementation, system 200 can calculate similarity by using term frequency or cosine similarity, the outcome of which is neatly bounded in [0,1]. For example, system 200 can compare, domain names www.xxx.com and www.xxx.org that are associated with different IP address by:

For the pre-classified website URL www.xxx.com, the anchor information, such as that listed below, can be collected and used for generating vectors.

Title: XXX Sex—Free Porn Movies—Porno Videos on XXX.com
Description: XXX Sex and Free Porn Videos on XXX.com
KeywordsText: xxx porn, free sex, p***y pics, free porn, xxx videos, xxx sex
LinkText: XXX Sex XXX sex Legal Porno Videos
contentText: XXX Sex—Free Porn Movies—Porno Videos on XXX.com XXX Sex and Free Porn Videos on XXX.com xxx porn, free sex, p***y pics, free porn, xxx videos, xxx sex width=device-width, initial-scale=1 xxx sex XXX VIDEOS::FREE PORN::HOT SEX PICS http://www.xnxx.com/xxx http://www.legalporno.com xxx videos http://www.xnxx.com/XXX Sex on XNXX.com—the #1 porn videos tube in the world! XNXX is a cloud host for free sex clips. Watch hardcore sex and movies from around the world! Enjoy the hot MILF films, teen lesbians and young (18+) Asian girls on our site. Over 3,900,000 http://www.xnxx.com XXX sex videos and HD porn pics with 10 minute update intervals. http://www.legalporno.com/ Legal Porno Videos—Hardcore HD and 3D sex tube.

XXX sex videos uploaded by amateurs who send their home made swinger sex clips and hardcore films. So inside you'll find: hot teens fking and the best p*y pics! Also pornstars, MILF moms and lesbian orgies. Enjoy hardcore f**king and anal sex on live web cams. XXX.com: Free Porn Movies Hub for full sex videos since 1994

In an aspect, HashTable 1 for xxx.com can be computed based on keywordsText of xxx.com as:

| Keyword | Number of occurrences |
|---------|----------------------|
| xxx     | 3                    |
| Sex     | 2                    |
| Porn    | 3                    |
| Free    | 2                    |
| Picture | 1                    |
| Video   | 1                    |
| P***y   | 1                    |

Similarly for the candidate domain name www.xxx.org which is desired to be classified, anchor information, such as that listed below, can be collected and used for generating vectors.

Title: XXX.com Porn—Free PORNO videos
Description: XXX sex, Porn Pics—Free PORNO videos. Enjoy XXX Videos
keywordsText: xxx sex, free sex movies, xxx porn videos, porno, xnxx, hardcore
linkText: Free XXX Sex XXX Porn on Xvideos.com
contentText: XXX.com Porn—Free PORNO videos XXX sex, Porn Pics—Free PORNO videos. Enjoy XXX Videos xxx sex, free sex movies, xxx porn videos, porno, xnxx, hardcore width=device-width, initial-scale=1 RTA-5042-1996-1400-1577-RTA xxx porn FREE XXX PORN Sexy videos with hot girls fking guys, giving them deepthroat blowjobs and enjoying double penetration on their cum filled hot p*y. http://www.xnxx.com free xxx sex Free XXX Sex Movies on XNXX http://www.xvideos.com xxx XXX Porn on Xvideos.com XNXX.com and XVIDEOS.com are free porno tube sites for home made porn movies and xxx videos. Watch our xxx clips and enjoy sexy and hot girls fking for your viewing pleasure. Over 5.000.000+ free sex videos and pictures inside hosted on a fast cloud tube without spam or popups. See mom and son or dad and daughter clips, MILF banging and granny fking and the most extreme DP ass to mouth action. We film our own material (on LegalPorno.com) and we also provide millions of selected scenes from virtually all available adult DVD films in existence. All we do is carefully select the best MILF, asian, black and hardcore p*y fking and stream it for free to billions of people around the world daily. Also we have exclusive deals with top anal sex and anal porno studios from Eastern Europe (Ukraine, Poland, Romania etc.) and we feature their content on our hub. http://www.xxx.com free porno www.xxx.com—2014 Hot p*y and sexy girls fking online In an aspect, HashTable 2 for xxx.org can also be computed based on the keywordsText of xxx.org as:

| Keyword | Number of occurrences |
|---------|----------------------|
| xxx     | 3                    |
| Sex     | 2                    |

-continued

| Keyword | Number of occurrences |
|---------|----------------------|
| Hardcore | 1 |
| Free | 1 |
| Video | 1 |
| Movie | 1 |
| Xnxx | 1 |
| Porno | 1 |

Based on the above hash tables 1 and 2, system 200 can compute a measure of similarity between the two vectors. In one embodiment the measure of similarity employed is cosine similarity, which in the context of the present example is 0.790569415042095. As one can appreciate, the keyword part of www.xxx.com and www.xxx.org is very similar. The following is a summary regarding various calculated cosine similarity calculations between various portions of xxx.com and xxx.org:

Title Similarity: 0.8249579113843053
Description Similarity: 0.7378647873726218
Keyword Similarity: 0.790569415042095
SubLink Similarity: 0.5477225575051661
Text Similarity: 0.8154361423412764
Weighted Similarity: 0.7433101627290929

Hence system 200 can reasonably conclude that both xxx.com and xxx.org belong to same category/classification/class. Those skilled in the art will appreciate cosine similarity is but one potential measure of similarity and other measures of similarity based on vector generation and/or hash computation may be used in addition to or instead of cosine similarity.

In another example, for www.ibm.info and www.ibm.com, both of which use different IP addresses, system 200 can observe that www.ibm.info is just a re-directing page, and its contents are totally same as www.ibm.com.

The following is a summary of cosine similarly calculated between www.ibm.com and www.ibm.info:

Title Similarity: 1.0
Description Similarity: 0.9999999999999998
Keyword Similarity: 1.0000000000000002
SubLink Similarity: 1.0000000000000002
Text Similarity: 1.0
Weighted similarity: 1.0, based on which system 200 can make a conclusion that both www.ibm.com and www.ibm.info belong to same category.

In yet another example, writeyourstory.co and writeyourstory.info may be compared by system 200. As one may know writeyourstory.co is a media web site having following metadata information/attributes:

Title: Write Your Story
Description: It's not about Writing your autobiography, It's about changing your life keywordsText: Self realization, Inner Wealth Education, Understanding Identity, Developing Passion, Having Vision, Building Confidence, Creating Possibilities, Taking Action, Making it Happen, Life Choices, Health, Wellness, Menopause, Depression, Relationships, Happiness, depression, Domestic Violence victim, peace, love, fengshui,
linkText:
contentText: Write Your Story It's not about Writing your autobiography, It's about changing your life Self realization, Inner Wealth Education, Understanding Identity, Developing Passion, Having Vision, Building Confidence, Creating Possibilities, Taking Action, Making it Happen, Life Choices, Health, Wellness, Menopause, Depression, Relationships, Happiness, depression, Domestic Violence victim, peace, love, fengshui, On the other hand, writeyourstory.info is T-Mobile's website, and its anchor/metadata information is:

Title: Cell Phones|4G Phones|iPhone and Android Phones|T-Mobile
Description: Discover T-Mobile's best cell phones and plans with no annual contract including iPhone & Android phones. See more on the T-Mobile blazing fast 4G network.
keywordsText:
linkText: BUSINESS ORDER NOW! 1-877-413-5903 ORDER NOW×Close How to enable cookies Shop Plans Coverage
contentText: Discover T-Mobile's best cell phones and plans with no annual contract including iPhone & Android phones. See more on the T-Mobile blazing fast 4G network.

A summary of cosine similarity between about writeyourstory.co and writeyourstory.info is as follows:

Title Similarity: 0.0
Description Similarity: 0.0
Keyword Similarity: 0.0
SubLinkSimilarity: 0.07220125057096644
Text Similarity: 0.005214490134287215
Weighted similarity: 0.014544539916879032, Given the great difference between writeyourstroy.co and writeyourstory.info it would be reasonable for system 200 to conclude that these two sites belong to different categories. In one embodiment, a contentText similarity or a weighted cosine similarity of approximately 0.7 or greater is sufficient to reasonably conclude two websites should have the same content classification. Depending upon the particular implementation, a text similarity of approximately 0.8 or greater may be desired.

Figure 3A:
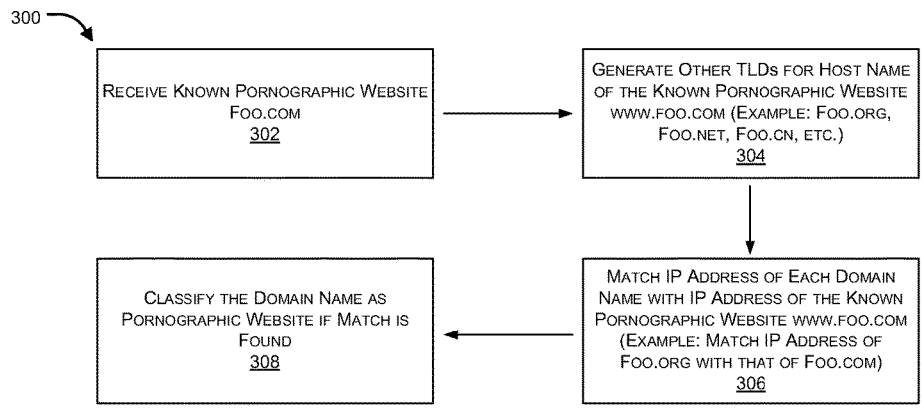
FIGS. 3A to 3C illustrate exemplary block diagrams illustrating various functionality of a domain name classification system in accordance with an embodiment of the present invention.
Figure 3B:
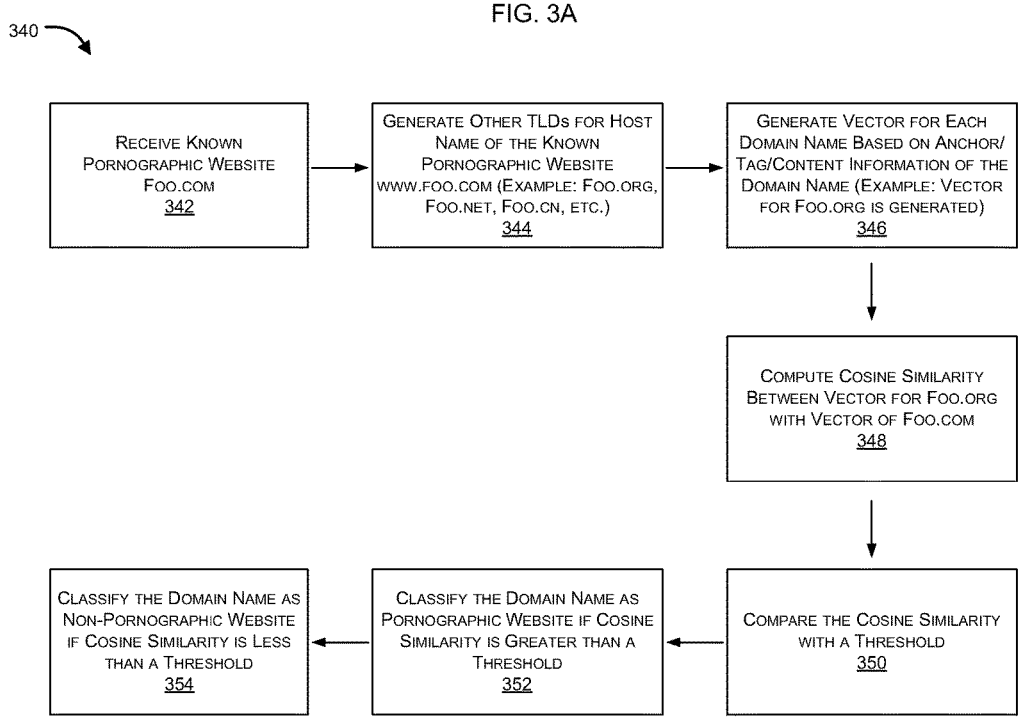
Figure 3C:
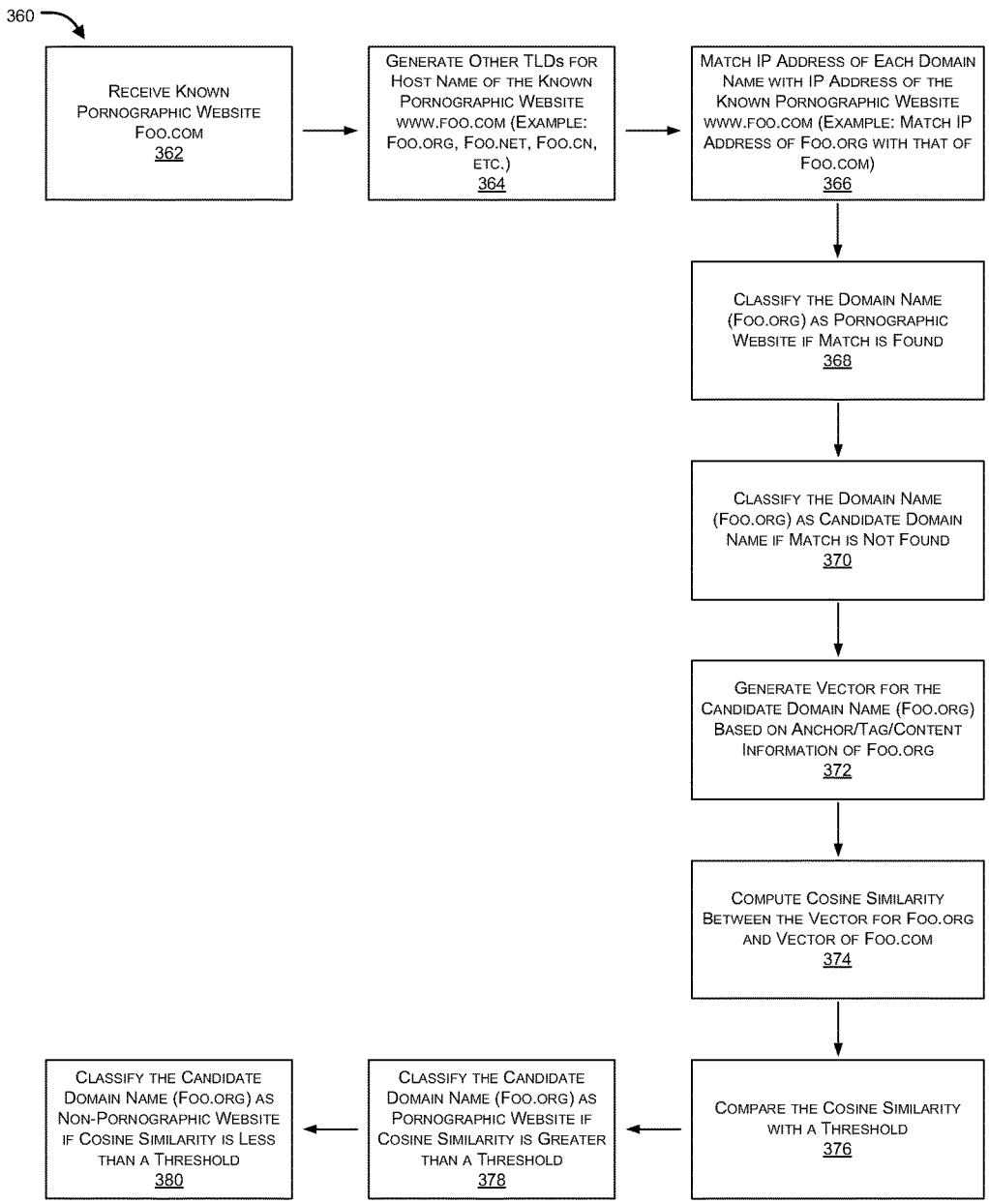

FIGS. 3A to 3C are exemplary block diagrams 30, 340 and 360 illustrating various functionalities of a domain name classification system in accordance with an embodiment of the present invention. FIG. 3A illustrates an IP address based classification of candidate domain names, wherein the system can receive a known/pre-classified website (e.g., one classified as being pornographic), for example, foo.com as shown at block 302. The system can then generate other TLDs based on the host name of the known pornographic website, for example foo.org, foo.net, foo.cn etc. as shown at block 304, and then match the IP address of each candidate domain name with the IP address of the known pornographic website as shown at block 306 so as to accordingly classify a candidate domain name as pornographic if a match is found between its IP address and the IP address of the known pornographic web site, as shown at block 308.

FIG. 3B illustrates a cosine similarity based determination of website classification in accordance with an embodiment of the present disclosure. As shown in FIG. 3B, the system can receive known pornographic website, for example foo.com as shown at block 342, add other top-level domain extensions to the host name of the known website to create a list of candidate domain names, for example foo.org, foo.net, foo.cn etc. as shown at block 344, generate a vector for each candidate domain name based on anchor/tag/content information/attributes of the respective candidate domain name as shown at block 346, compute cosine similarity between the vector of foo.org (or any other candidate domain name) and the vector of foo.com as shown at block 348, compare the computed cosine similarity with a predetermined and/or configurable threshold as shown at block 350, classify the candidate domain name as pornographic if cosine similarity is greater than or equal to the threshold as shown at block 352, and classify the candidate domain name as non-pornographic if cosine similarity is less than the threshold as shown at block 354.

FIG. 3C illustrates an exemplary block diagram of domain name classification system in accordance with an embodiment of the present disclosure. In an exemplary implementation, the system can receive a known pornographic website, for example foo.com, and generate other possible/candidate domain names involving the same host name of the known pornographic website foo.com, for example foo.org, foo.net, foo.cn etc. The system can then match the IP address of each candidate domain name with the IP address of the known pornographic website, for example match the IP address of foo.org with the IP address of foo.com as shown at block 366. In an exemplary implementation, the system can classify the candidate domain name, for example foo.org, as pornographic website when the IP addresses are the same as shown at step 368, or can classify the possible domain name, for example foo.org, as a candidate domain name if a match of IP address match is not found as shown at block 370. For each candidate domain name, the system can further generate a vector, for example a vector 1 can be generated for foo.org based on anchor/tag/content information/attributes of foo.org as shown at block 372, and can then compute cosine similarity between the vector for foo.org and vector for foo.com as shown at block 374. The system can finally compare the cosine similarity to a threshold as shown at block 376, and classify the candidate domain name, foo.org, as pornographic when the cosine similarity is greater than or equal to the threshold as shown at block 378. In an exemplary implementation, the system can classify the candidate domain name as non-pornographic when the cosine similarity is less than the threshold as shown at 380.

Although embodiments of the present disclosure have been described with reference to classification of website URL as pornographic website or non-pornographic website, one may appreciate that systems and methods of present disclosure can be used for classifying website URLs into any predefined content class, sub-class or content category.

Figure 4A:
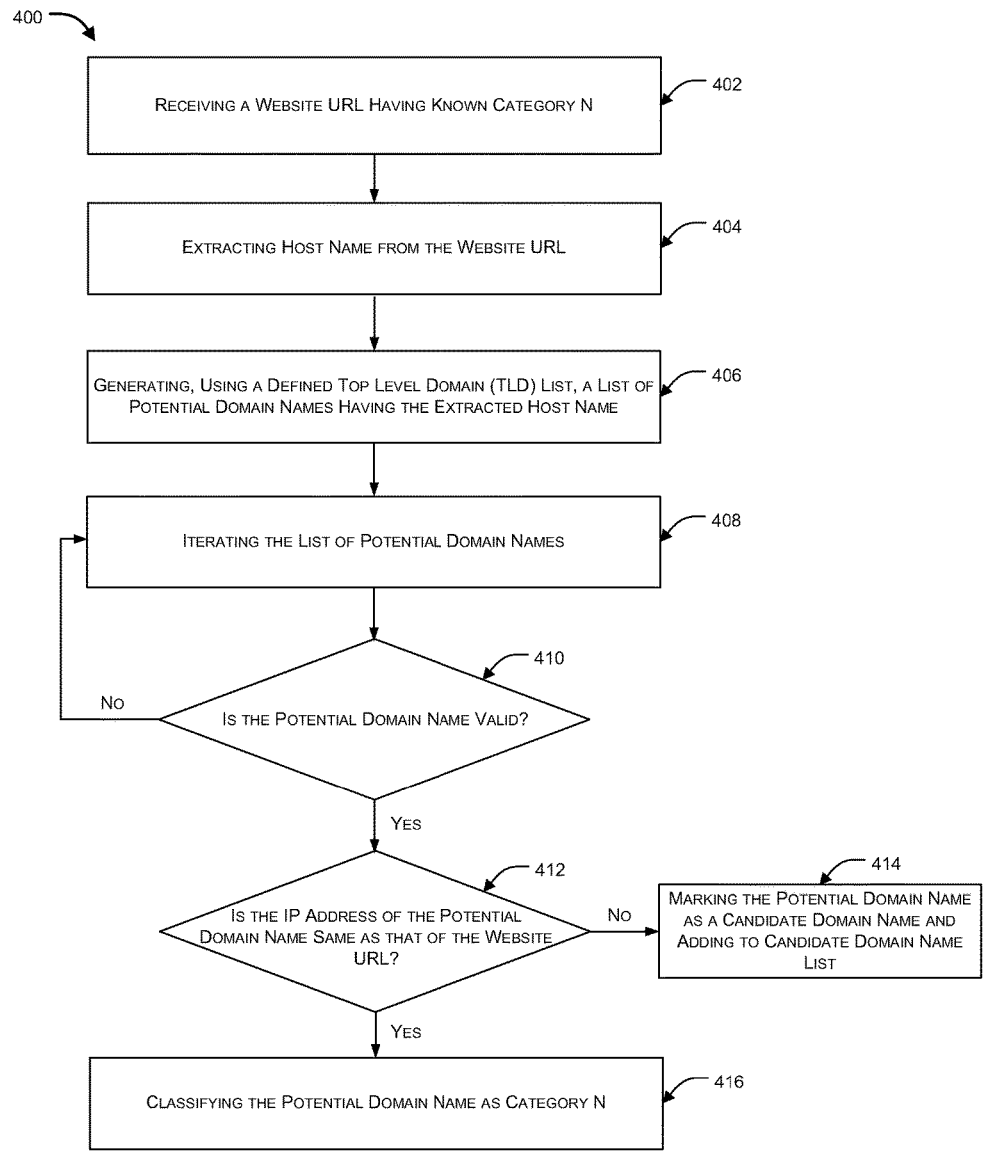
FIGS. 4A to 4C are flow diagrams illustrating processing performed by a domain name/website/URL classification system in accordance with an embodiment of the present invention.
Figure 4B:
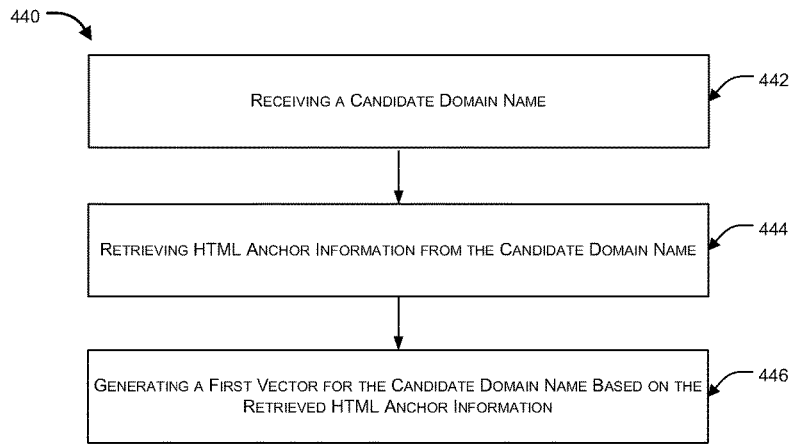
Figure 4C:
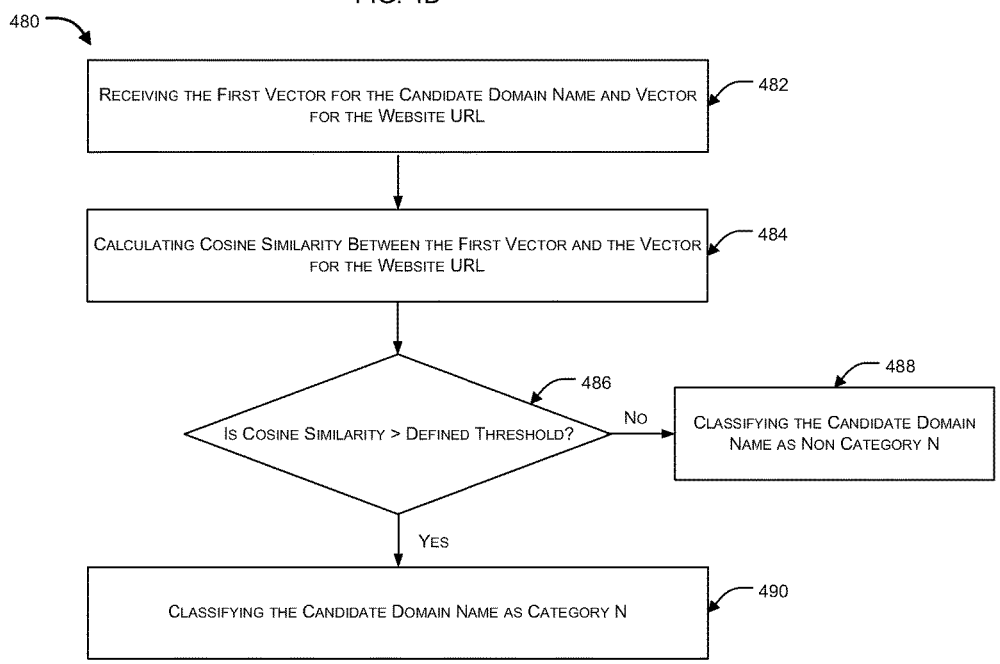

FIGS. 4A to 4C are flow diagrams 400, 440 and 480 illustrating processing performed by a domain name/website/URL classification system in accordance with an embodiment of the present invention. In an aspect, the method can include the steps of receiving a website URL having a known category N as shown at step 402, extracting the host name portion from the website URL as shown at step 404, generating, using a defined TLD list, a list of potential domain names having the extracted host name and a different TLD extension as shown at step 406, and iterating over the list of potential domain names as shown at step 408. The method can include the steps of checking if the potential domain name is a valid domain name as shown at step 408 such that if the potential domain name is valid, then a further check is performed with respect to whether the IP address of the potential domain name is same as that of the website URL as shown at step 412. In an exemplary implementation, when the IP address of the potential domain name is the same as that of the website URL, the method can classify the potential domain name as also being associated with category N, as shown at step 416. In an exemplary implementation, when the IP address of the potential domain name is not same as that of the website URL, the method can mark the potential domain name as a candidate domain name to be further compared to the website URL by performing similarity measurement processing as shown at step 414.

FIG. 4B illustrates further processing of each candidate domain name of the candidate domain name list. The method can include the steps of receiving a candidate domain name as shown at step 442, retrieving HTML anchor information from the candidate domain name as shown at step 444, and generating a first vector for the candidate domain name based on the retrieved HTML anchor information as shown at step 446. As shown in FIG. 4C, the method can further include the steps of receiving the first vector for the candidate domain name and vector for the website URL as shown at step 482, calculating cosine similarity between the first vector and the vector for the website URL as shown at step 484, checking if the cosine similarity is greater than a predefined threshold as shown at step 486, and classifying the candidate domain name as category N if the cosine similarity is greater than or equal to the defined threshold, as shown at step 490. In an exemplary implementation, if the cosine similarity is not greater than or equal to the defined threshold, the method can classify the candidate domain name as a "non-" category N website as shown at step 488. In an exemplary implementation, the defined threshold can be 70% similarity, 80% similarity or any predefined and/or configurable value that may be set by a network administrator.

Figure 5:
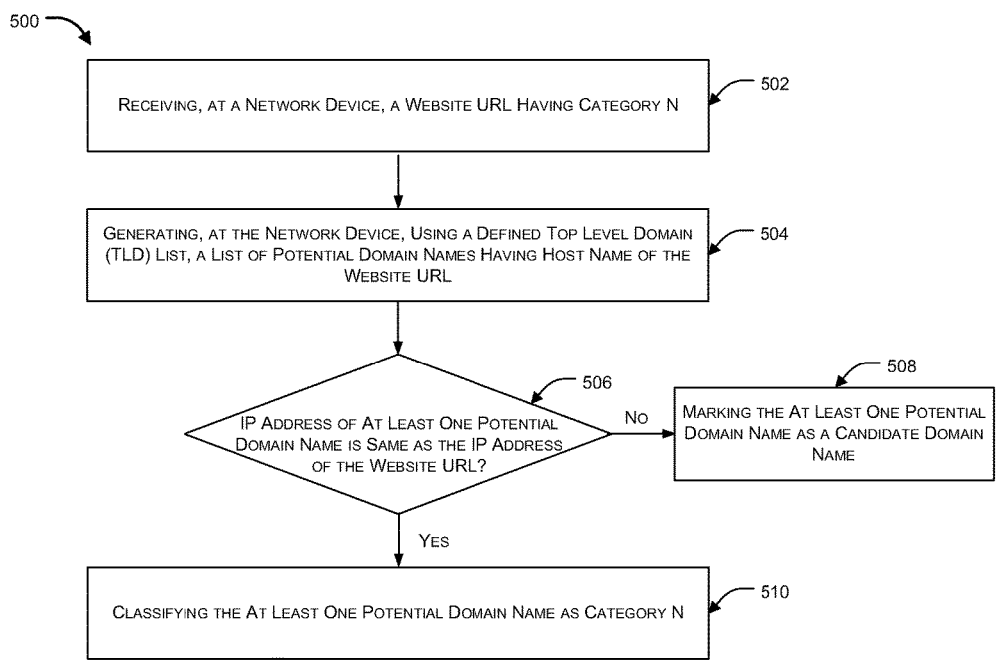
FIG. 5 is a flow diagram illustrating domain name classification processing based on IP address comparison in accordance with an embodiment of the present invention.

FIG. 5 is a flow diagram 500 illustrating domain name classification processing based on IP address comparison in accordance with an embodiment of the present invention. A method for IP address based webpage classification can include the steps of receiving, at a network device, a website URL having category N as shown at step 502, generating, at the network device, using a predefined and/or configurable TLD extension list, a list of potential domain names having a host name of the website URL but using extensions from the TLD extension list as shown at step 504 and checking if the IP address of at least one potential domain name is the same as the IP address of the web site URL as shown at step 506. In an exemplary implementation, the method can further include the steps of classifying the at least one potential domain name as category N if the IP address of the at least one potential domain name is the same as the IP address of the website URL as shown at step 510, and marking the at least one potential domain name as a candidate domain name for further processing as shown at step 508 if the IP address of the at least one potential domain name is not same as the IP address of the website URL.

Figure 6:
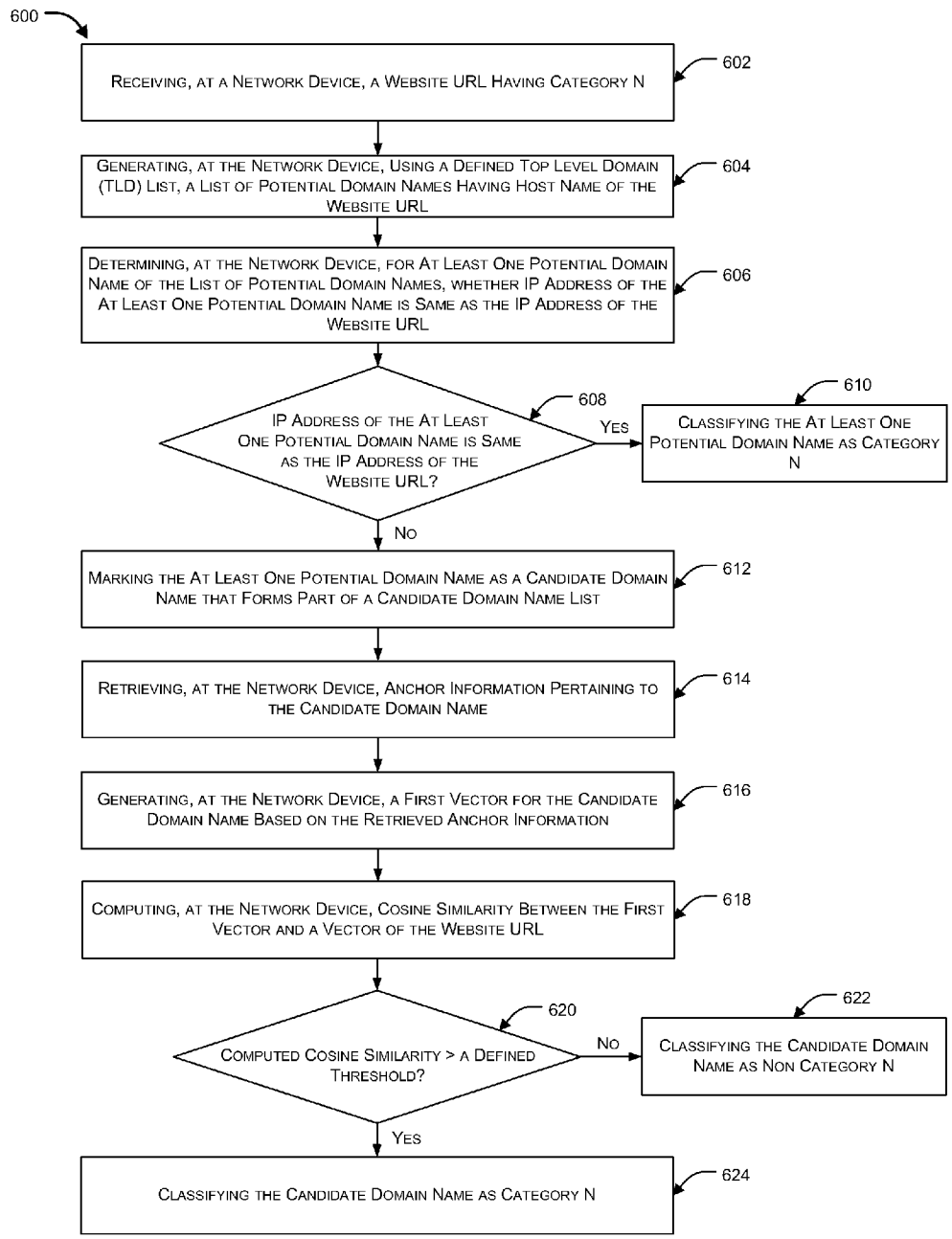
FIG. 6 is a flow diagram illustrating domain name classification processing based on IP address comparison and cosine vector similarity between two domain names in accordance with an embodiment of the present invention.

FIG. 6 is a flow diagram 600 illustrating domain name classification processing based on IP address comparison and cosine vector similarity between two domain names in accordance with an embodiment of the present invention. IP address comparison and cosine vector similarity based method for webpage classification can include the steps of receiving, at a network device, a website URL having category N as shown at step 602; generating, at the network device, using a defined top level domain list, a list of potential domain names having host name of the web site URL as shown at step 604; and determining, at the network device, for at-least one potential domain name of the list of potential domain names, whether the IP address of the at-least one potential domain name is the same as the IP address of the web site URL as shown at step 606. The method further includes the steps of checking if the IP address of the at-least one potential domain name is the same as the IP address IP of the website as shown at step 608; and classifying the at-least one potential domain name as category N if the IP address of the at-least one potential domain name is the same as the IP address IP of the website as shown at step 610. In an exemplary implementation, the method further includes the steps of marking the at-least one potential domain name as a candidate domain name that forms part of a candidate domain name list to be further processed as shown at step 612; retrieving, at the network device, anchor information pertaining to the candidate domain name as shown at step 614; generating, at the network device, a first vector for the candidate domain name based on the retrieved anchor information as shown at step 616 and computing, at the network device, cosine similarity between the first vector and a vector of the website URL as shown at step 618. In an exemplary implementation, the method further includes steps of comparing cosine similarity with a defined threshold as shown at step 620 and classifying the candidate domain name as category N if the computed cosine similarity is greater than or equal to the defined threshold as shown at step 614. In an exemplary implementation, if the computed cosine similarity is not greater than or equal to the defined threshold, the method can classify the candidate domain name as non-category N.

Figure 7:
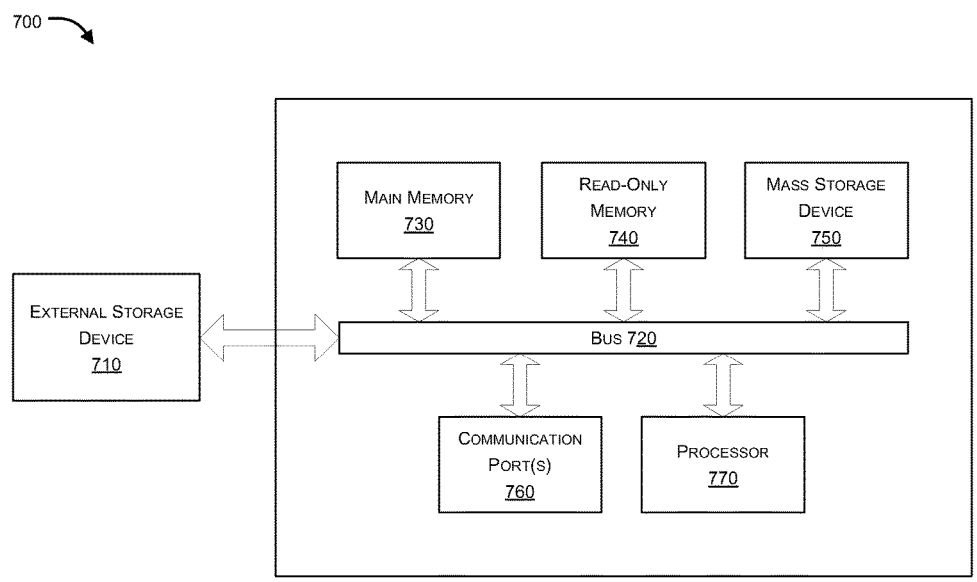
FIG. 7 illustrates an exemplary computer system in which or with which embodiments of the present invention may be utilized.

FIG. 7 illustrates an exemplary computer system 700 in which or with which embodiments of the present invention may be utilized. Computer system 700 may represent a network security device (e.g., network security device 106) that performs classification of web sites and/or their corresponding URLs based on a known web site classification of a base web site or domain name in order to perform network security services for a protected network. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 720, a processor 770, communication port 760, a main memory 730, a removable storage media 710, a read only memory 740 and a mass storage 750. A person skilled in the art will appreciate that computer system 700 may include more than one processor and communication ports. Examples of processor 770 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 770 may include various modules associated with embodiments of the present invention.

Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system 700 connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g. start-up or BIOS instructions for processor 770.

Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system. Optionally, wire operator and administrative interfaces, e.g. a display, keyboard, and a cursor control device, may also be coupled to bus 720 to support direct operator interaction with computer system 700.

Other operator and administrative interfaces can be provided through network connections connected through communication port 760. External storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
    receiving, by a computer system, a website Uniform Resource Locator (URL) that is known to be associated with a particular content classification;
    generating, by the computer system, a list of candidate domain names, each including a host name of the website URL and a different top-level domain (TLD) extension based on a predefined TLD list;
    determining, by the computer system, for each of the candidate domain names in the list of candidate domain names, whether an Internet Protocol (IP) address of the candidate domain name is equal to an IP address of the website URL;
    when a result of said determining is affirmative, then associating the particular content classification with the candidate domain name; and
    when the result is negative, then performing a cosine similarity measurement process between information associated with the candidate domain name and information associated with the website URL to determine whether to associate the particular content classification with the candidate domain name.

2. The method of claim 1, wherein the cosine similarity measurement process further comprises:
    retrieving anchor information pertaining to the candidate domain name;
    generating a first vector for the candidate domain name based on the retrieved anchor information;
    computing a cosine similarity metric between the first vector and a corresponding vector of the web site URL;
    determining whether the computed cosine similarity metric is greater than a defined threshold; and
    when the computed cosine similarity metric is determined to be greater than the defined threshold, then associating the particular content classification with the candidate domain name.

3. The method of claim 2, wherein the anchor information comprises one or a combination of:
    tags of a web page to which the candidate domain name pertains;
    a title of the web page;
    metadata of the web page;
    hyperlinks of the web page;
    content of the web page;
    display attributes of the web page;
    a structure of the web page; and
    a layout of the web page.

4. The method of claim 2, further comprising:
    hashing the first vector to generate a first hash; and
    wherein said computing a cosine similarity metric involves comparing the first hash with a hash of the vector of the website URL.

5. The method of claim 1, wherein each candidate domain name in the list of candidate domain names comprises a fully qualified domain name (FQDN).

6. The method of claim 1, wherein the particular content classification is indicative of pornographic content.

7. A non-transitory computer-readable storage medium embodying a set of instructions, which when executed by one or more processors of one or more computer systems, causes the one or more processors to perform a method comprising:
    receiving a website Uniform Resource Locator (URL) that is known to be associated with a particular content classification;
    generating a list of candidate domain names, each including a host name of the website URL and a different top-level domain (TLD) extension based on a predefined TLD list;
    determining for each of the candidate domain names in the list of candidate domain names whether an IP address of the candidate domain name is equal to an Internet Protocol (IP) address of the website URL;
    when a result of said determining is affirmative, then associating the particular content classification with the candidate domain name; and
    when the result is negative, then performing a cosine similarity measurement process between information associated with the candidate domain name and information associate with the website URL to determine whether to associate the particular content classification with the candidate domain name.

8. The non-transitory computer-readable storage medium of claim 7, wherein the cosine similarity measurement process further comprises:
    retrieving anchor information pertaining to the candidate domain name;
    generating a first vector for the candidate domain name based on the retrieved anchor information;
    computing a cosine similarity metric between the first vector and a corresponding vector of the web site URL;
    determining whether the computed cosine similarity metric is greater than a defined threshold; and
    when the computed cosine similarity metric is determined to be greater than the defined threshold, then associating the particular content classification with the candidate domain name.

9. The non-transitory computer-readable storage medium of claim 8, wherein the anchor information comprises one or a combination of:
    tags of a web page to which the candidate domain name pertains;
    a title of the web page;
    metadata of the web page;
    hyperlinks of the web page;
    content of the web page;
    display attributes of the web page;
    a structure of the web page; and
    a layout of the web page.

10. The non-transitory computer-readable storage medium of claim 8, wherein the method further comprises:
    hashing the first vector to generate a first hash; and
    wherein said computing a cosine similarity metric involves comparing the first hash with a hash of the vector of the website URL.

11. The non-transitory computer-readable storage medium of claim 7, wherein each candidate domain name in the list of candidate domain names comprises a fully qualified domain name (FQDN).

12. The non-transitory computer-readable storage medium of claim 7, wherein the particular content classification is indicative of pornographic content.

\* \* \* \* \*